(12) United States Patent
Kaneko et al.

(10) Patent No.: US 10,377,104 B2
(45) Date of Patent: Aug. 13, 2019

(54) COMPOSITE SKIN MATERIAL FOR VEHICLE

(71) Applicants: SEIREN CO., LTD., Fukui-shi, Fukui (JP); HONDA MOTOR CO., LTD, Tokyo (JP)

(72) Inventors: Yukito Kaneko, Fukui (JP); Tomoyuki Uemura, Wako (JP); Sugiaki Yamazato, Wako (JP)

(73) Assignees: Seiren Co., Ltd., Fukui (JP); Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 15/456,712

(22) Filed: Mar. 13, 2017

(65) Prior Publication Data

US 2017/0266913 A1    Sep. 21, 2017

(30) Foreign Application Priority Data

Mar. 15, 2016    (JP) .................. 2016-051303

(51) Int. Cl.
*B32B 3/24* (2006.01)
*B32B 5/02* (2006.01)
(Continued)

(52) U.S. Cl.
CPC .............. *B32B 3/266* (2013.01); *B32B 5/024* (2013.01); *B32B 5/26* (2013.01); *B32B 7/12* (2013.01);
(Continued)

(58) Field of Classification Search
None
See application file for complete search history.

(56) References Cited

U.S. PATENT DOCUMENTS 2,628,928 A * 2/1953 Cadous .................. B32B 3/266
156/123
3,262,805 A * 7/1966 Aoki .................... D06N 3/0077
156/79

(Continued)

FOREIGN PATENT DOCUMENTS

CN    2890137 Y * 4/2007
CN    101440578 A * 5/2009
(Continued)

OTHER PUBLICATIONS

Machine Translation of JP 2001164477 A, Jun. 2001 (Year: 2001).*
Machine Translation of CN 202623391 U, Oct. 2004 (Year: 2004).*

*Primary Examiner* — Jeffrey A Vonch
(74) *Attorney, Agent, or Firm* — Norris McLaughlin, P.A.

(57) ABSTRACT

A composite skin material for a vehicle includes a fibrous substrate, a polyurethane resin layer provided on the front side of the fibrous substrate, and a woven fabric adhered to the back side of the fibrous substrate through an adhesive layer comprising a polyurethane resin. Openings penetrating the fibrous substrate from the front of the polyurethane resin layer are provided in the composite skin material, and an opening ratio on the front of the polyurethane resin layer is 1 to 15%. The woven fabric has a warp density of 25 to 50 yarns/25.4 mm and a weft density of 30 to 50 yarns/25.4 mm, and the mass per unit area of the adhesive layer is 15 to 100 g/m². The composite skin material has air permeability of 5 to 100 cm³/cm²·s, tear strength of 20 to 150N, and tensile strength of 50 N/cm or more.

5 Claims, 1 Drawing Sheet

(51) Int. Cl.
   *B32B 5/26*       (2006.01)
   *B32B 27/40*      (2006.01)
   *D03D 1/00*       (2006.01)
   *D06N 3/14*       (2006.01)
   *B32B 3/26*       (2006.01)
   *D06N 3/00*       (2006.01)
   *D06N 7/00*       (2006.01)
   *B32B 7/12*       (2006.01)
   *B32B 27/12*      (2006.01)
   *B32B 27/02*      (2006.01)
   *B32B 27/36*      (2006.01)
   *B60R 13/02*      (2006.01)
   *D03D 13/00*      (2006.01)
   *B32B 27/08*      (2006.01)
   *B60N 2/58*       (2006.01)
   *B32B 5/12*       (2006.01)
   *B32B 27/28*      (2006.01)

(52) U.S. Cl.
   CPC .............. *B32B 27/12* (2013.01); *B32B 27/40* (2013.01); *D06N 3/0006* (2013.01); *D06N 3/0013* (2013.01); *D06N 3/0054* (2013.01); *D06N 3/14* (2013.01); *D06N 7/0092* (2013.01); *B32B 5/022* (2013.01); *B32B 5/026* (2013.01); *B32B 5/12* (2013.01); *B32B 27/02* (2013.01); *B32B 27/08* (2013.01); *B32B 27/285* (2013.01); *B32B 27/36* (2013.01); *B32B 27/365* (2013.01); *B32B 2250/02* (2013.01); *B32B 2250/03* (2013.01); *B32B 2250/04* (2013.01); *B32B 2250/20* (2013.01); *B32B 2255/02* (2013.01); *B32B 2255/26* (2013.01); *B32B 2262/0276* (2013.01); *B32B 2262/14* (2013.01); *B32B 2305/188* (2013.01); *B32B 2307/54* (2013.01); *B32B 2307/554* (2013.01); *B32B 2307/5825* (2013.01); *B32B 2307/718* (2013.01); *B32B 2307/724* (2013.01); *B32B 2367/00* (2013.01); *B32B 2375/00* (2013.01); *B32B 2605/00* (2013.01); *B32B 2605/003* (2013.01); *B60N 2/5875* (2013.01); *B60R 13/0212* (2013.01); *B60R 13/0243* (2013.01); *B60R 13/0256* (2013.01); *D03D 1/00* (2013.01); *D03D 13/008* (2013.01); *D06N 3/009* (2013.01); *D06N 2201/02* (2013.01); *D06N 2203/068* (2013.01); *D06N 2209/103* (2013.01); *D06N 2209/105* (2013.01); *D06N 2209/123* (2013.01); *D06N 2211/261* (2013.01); *D06N 2211/28* (2013.01); *D06N 2213/04* (2013.01); *D06N 2213/045* (2013.01); *Y10T 428/2481* (2015.01); *Y10T 428/24132* (2015.01); *Y10T 428/24331* (2015.01); *Y10T 428/24851* (2015.01); *Y10T 428/31551* (2015.04); *Y10T 428/31565* (2015.04); *Y10T 442/322* (2015.04); *Y10T 442/3472* (2015.04); *Y10T 442/3813* (2015.04)

(56) References Cited

U.S. PATENT DOCUMENTS

| | | | | |
|---|---|---|---|---|
| 3,387,989 A | * | 6/1968 | West | B01D 67/003 264/49 |
| 3,652,747 A | * | 3/1972 | Shirota | B32B 5/18 264/321 |
| 4,003,777 A | * | 1/1977 | Eddy | D06N 3/0086 156/148 |
| 4,017,656 A | * | 4/1977 | Lasman | B32B 27/40 428/86 |
| 4,264,659 A | * | 4/1981 | Pattenden | B32B 27/12 428/35.2 |
| 4,426,421 A | * | 1/1984 | Nakamae | B32B 5/00 442/271 |
| 4,465,730 A | * | 8/1984 | Okada | B32B 5/26 442/243 |
| 5,484,646 A | * | 1/1996 | Mann | B32B 27/12 428/198 |
| 5,932,494 A | * | 8/1999 | Crippa | D03D 15/00 139/426 TW |
| 5,993,944 A | * | 11/1999 | Honna | B32B 5/26 428/151 |
| 6,451,404 B1 | * | 9/2002 | Nobuto | A43B 1/00 428/91 |
| 2001/0024709 A1 | * | 9/2001 | Yoneda | A43B 1/14 428/91 |
| 2002/0104576 A1 | * | 8/2002 | Howland | A41D 19/01505 139/421 |
| 2003/0017322 A1 | * | 1/2003 | Kim | B32B 5/24 428/315.7 |
| 2005/0009426 A1 | * | 1/2005 | Hwang | B32B 5/26 442/59 |
| 2005/0100710 A1 | * | 5/2005 | Feng | B32B 27/12 428/151 |
| 2005/0255776 A1 | * | 11/2005 | Howland | B32B 5/26 442/286 |
| 2007/0066173 A1 | * | 3/2007 | Teofrasti | B32B 5/022 442/346 |
| 2007/0082176 A1 | * | 4/2007 | Schaefer | B32B 3/266 428/151 |
| 2007/0248787 A1 | * | 10/2007 | Chou | B32B 5/26 428/91 |
| 2008/0045104 A1 | * | 2/2008 | Sugiyama | D06N 3/0004 442/141 |
| 2008/0187715 A1 | * | 8/2008 | Wang | B32B 5/18 428/118 |
| 2008/0293316 A1 | * | 11/2008 | Hwang | B32B 5/06 442/60 |
| 2009/0291250 A1 | * | 11/2009 | Okada | B32B 5/26 428/91 |
| 2009/0311480 A1 | * | 12/2009 | Fischer | B32B 27/12 428/160 |
| 2010/0068499 A1 | * | 3/2010 | Kanagawa | D06N 3/0056 428/318.6 |
| 2010/0247895 A1 | * | 9/2010 | Uemura | B32B 7/12 428/317.7 |
| 2010/0255270 A1 | * | 10/2010 | Stuebiger | B32B 5/02 428/201 |
| 2010/0330333 A1 | * | 12/2010 | Jokisch | B32B 27/12 428/141 |
| 2011/0189434 A1 | * | 8/2011 | Ou | D03D 25/00 428/151 |
| 2013/0288554 A1 | * | 10/2013 | Mallen | B32B 38/1875 442/319 |
| 2015/0298440 A1 | * | 10/2015 | Crotty | B32B 27/14 442/397 |
| 2015/0299944 A1 | * | 10/2015 | Sugiura | D06N 3/14 428/137 |
| 2016/0221317 A1 | * | 8/2016 | Hayashi | B32B 5/022 |
| 2016/0273159 A1 | * | 9/2016 | Feng | D06N 3/0043 |
| 2017/0136715 A1 | * | 5/2017 | Martin | D06N 3/14 |
| 2017/0183815 A1 | * | 6/2017 | Kuroda | D06N 3/0004 |
| 2017/0253015 A1 | * | 9/2017 | Chu | B32B 37/04 |
| 2017/0266937 A1 | * | 9/2017 | Feng | B32B 27/40 |
| 2017/0305126 A1 | * | 10/2017 | Takeshita | B32B 27/12 |

FOREIGN PATENT DOCUMENTS

| | | | | |
|---|---|---|---|---|
| CN | 101538802 A | * | 9/2009 | |
| CN | 201534935 U | * | 7/2010 | |
| CN | 202623391 U | * | 12/2012 | |
| CN | 104372654 A | * | 2/2015 | |
| CN | 104389186 A | * | 3/2015 | |
| GB | 2400377 A | * | 10/2004 | ............... C14B 5/00 |
| JP | 59116477 A | * | 7/1984 | |
| JP | S59-116477 A | | 7/1984 | |

(56) References Cited

FOREIGN PATENT DOCUMENTS

| | | | | |
|---|---|---|---|---|
| JP | 01246480 | A * | 10/1989 | ............ D06N 3/007 |
| JP | 02026737 | A * | 1/1990 | |
| JP | 07216756 | A * | 8/1995 | |
| JP | 09031863 | A * | 2/1997 | |
| JP | 11209800 | A * | 8/1999 | |
| JP | H11-209800 | A | 8/1999 | |
| JP | 11256483 | A * | 9/1999 | |
| JP | 2000239974 | A * | 9/2000 | |
| JP | 2001164477 | A * | 6/2001 | |
| JP | 2006283221 | A * | 10/2006 | |
| JP | 2010248644 | A * | 11/2010 | |
| JP | 2011094273 | A * | 5/2011 | |
| JP | 2011231436 | A * | 11/2011 | |
| WO | 2015/022772 | | 2/2015 | |

* cited by examiner

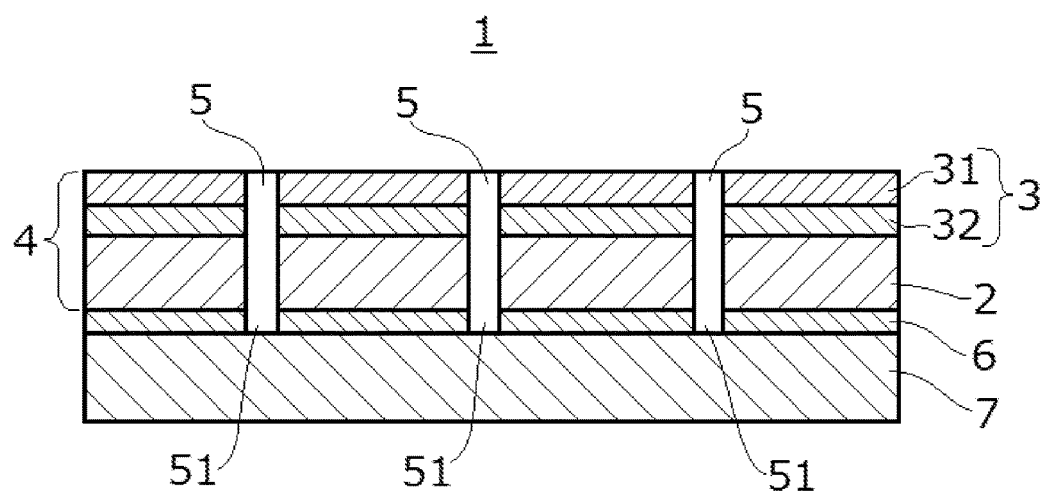

COMPOSITE SKIN MATERIAL FOR VEHICLE

CROSS-REFERENCE TO RELATED APPLICATIONS

This application is based upon and claims the benefit of priority from the prior Japanese Patent Application No. 2016-51303, filed on Mar. 15, 2016; the entire contents of which are incorporated herein by reference.

BACKGROUND

1. Technical Field

The embodiment of the present invention relates to a composite skin material for a vehicle.

2. Related Art

A conventional synthetic leather is that its front face is covered with a resin layer. As a result, in the case where the synthetic leather is used in a vehicle interior material, particularly seat surface, there is a problem that stuffiness and stickiness are generated by perspiration when seated over a long period of time. To overcome the problem, an attempt is generally made to eliminate stuffiness and stickiness by forming a plurality of openings in leathers by drilling (for example, JP-A (Hei) 11-209800), thereby improving air permeability of leathers. This attempt eliminates stuffiness and stickiness, but cannot obtain strength necessary to use as a vehicle interior material.

To overcome this problem, WO2015/022772 discloses a synthetic leather having openings provided therein that enables to achieve both elimination of stuffiness and stickiness and strength by that yarns of 84 dtex or more are used as a fibrous substrate, a tricot knitting fabric in which a knitted texture formed by front yarns is a code stitch texture with at least three-needle underlapping, a knitted texture formed by middle yarns is a chain stitch texture and a knitted texture formed by back yarns is a denbigh or code stitch texture, is used, and the thickness of a polyurethane resin layer laminated on the fibrous substrate is 100 μm or more. However, this technology limits constitution of a fibrous substrate. Therefore, the technology achieving both air permeability and strength regardless of the constitution of a fibrous substrate is desired.

JP-A (Sho) 59-116477 discloses an artificial leather that can achieve both soft feeling and high strength by adhering woven or knitted fabric to the back of an artificial leather comprising a nonwoven fabric impregnated with a resin by dot-form focal adhesion in an area of 5 to 70% of the total area and specifying the relationship between tensile strength and tensile elongation in the artificial leather and the woven or knitted fabric. In this document, the artificial leather and the woven or knitted fabric are adhered to each other in dot form using a low melting point polymer. In the case where such a dot-form adhesion technology has been applied to a synthetic leather having openings, strength sufficient for use as a vehicle interior material cannot be obtained.

Various technologies have conventionally been proposed as above, but a synthetic leather or a skin material for a vehicle, that eliminates stuffiness and stickiness to an extent such that there is no problem in the use as a vehicle interior material, and further has sufficient strength could not be obtained.

SUMMARY

In view of the above, an object of the embodiment of the present invention is to provide a composite skin material for a vehicle, having sufficient strength, particularly tear strength and tensile strength, for use as a vehicle interior material without deteriorating air permeability sufficient to eliminate stuffiness and stickiness.

A composite skin material for a vehicle according to an embodiment of the present invention comprises a fibrous substrate, a polyurethane resin layer provided on the front side of the fibrous substrate, and a woven fabric adhered to the back side of the fibrous substrate through an adhesive layer comprising a polyurethane resin, wherein the polyurethane resin layer has a plurality of openings on the front thereof. A plurality of the openings are holes penetrating the fibrous substrate from the front of the polyurethane resin layer, and an opening ratio on the front of the polyurethane resin layer is 1 to 15%. The woven fabric has a warp density of 25 to 50 yarns/25.4 mm and a weft density of 30 to 50 yarns/25.4 mm. Mass per unit area of the adhesive layer is 15 to 100 g/m$^2$. Air permeability of the composite skin material is 5 to 100 cm$^3$/cm$^2$·s. Tear strengths in a warp direction and a weft direction of the composite skin material each are 20 to 150N. Tensile strengths in a warp direction and a weft direction of the composite skin material each are 50 N/cm or more.

In one embodiment, through-holes connected to the openings may be formed on the adhesive layer at the positions corresponding to the openings, and the through-holes may be covered with the woven fabric.

The composite skin material satisfying the above requirements can provide a composite skin material for a vehicle having sufficient strength, particularly tear strength and tensile strength, for use as a vehicle interior material without deteriorating sufficient air permeability for eliminating stuffiness and stickiness.

BRIEF DESCRIPTION OF THE DRAWING

FIG. 1 is a cross-sectional view schematically showing a composite skin material for a vehicle according to one embodiment.

DETAILED DESCRIPTION

The embodiment of the present invention is described in detail below by reference to the accompanying drawing.

A composite skin material for a vehicle according to the present embodiment comprises a fibrous substrate, a polyurethane resin layer having openings provided on the front side of the fibrous substrate, and a woven fabric adhered to the back side of the fibrous substrate through an adhesive layer. The composite skin material is a skin material in which a synthetic leather comprising the fibrous substrate and the polyurethane resin layer is compositely integrated with the woven fabric.

FIG. 1 is a view schematically showing a cross-sectional structure of a composite skin material 1 for a vehicle according to one embodiment. In the composite skin material 1, a polyurethane resin layer 3 is provided on the front (that is, the right face) side of a fibrous substrate 2. A synthetic leather 4 is formed by the fibrous substrate 2 and the polyurethane resin layer 3. In this embodiment, the polyurethane resin layer 3 comprises a skin resin layer 31 and an adhesive resin layer 32, and the skin resin layer 31 is laminated on the fibrous substrate 2 through the adhesive resin layer 32.

A plurality of openings 5 for improving air permeability are provided on the front of the polyurethane resin layer 3 (that is, the front of the synthetic leather 4). The openings 5 are provided so as to penetrate the fibrous substrate 2 from the front of the polyurethane resin layer 3, and specifically are provided as holes penetrating the polyurethane resin layer 3 and the fibrous substrate 2. Although not shown in the drawing, an uneven pattern such as a leather-like embossed pattern may be provided on the front of the polyurethane resin layer 3 according to the conventional method.

Woven fabric 7 is laminated on the back (that is, the reverse face) of the fibrous substrate 2 (that is, the back of the synthetic leather 4) through an adhesive layer 6. By this configuration, the openings 5 of the synthetic leather 4 are covered with the woven fabric 7 from the back side of the synthetic leather.

In the present specification, the front of the synthetic leather and composite skin material means a face appeared from a user (a passenger) when using (specifically, the state that the composite skin material is mounted to a vehicle) in front and back surfaces of the synthetic leather and composite skin material, and the back of the synthetic leather and composite skin material means a face opposite the front. Furthermore, the front of each layer of the fibrous substrate or the like means a face facing the same direction as the front of the synthetic leather and composite skin material in front and back surfaces of each layer, and the back of each layer means a face opposite the front of each layer.

The fibrous substrate in the present embodiment is not particularly limited, and can be appropriately selected from a woven fabric, a knitted fabric, a non-woven fabric and the like depending on the use purpose.

A material of a fiber constituting the fibrous substrate is not particularly limited, and can use the conventional natural fiber, regenerated fiber, synthetic fiber, semi-synthetic fiber and the like. Those fibers can be used alone in one kind or as combinations of two or more kinds thereof. From the standpoint of strength suitable for use in a vehicle interior material, the material of a fiber is preferably a synthetic fiber, and more preferably polyester.

The synthetic leather used in the present embodiment comprises the fibrous substrate having laminated thereon the polyurethane resin layer, and specifically comprises the fibrous substrate and the polyurethane resin layer directly formed thereon or formed thereon through the adhesive resin layer. The polyurethane resin layer is a layer comprising a polyurethane resin formed on the fibrous substrate, and the layer is not limited to a single layer structure, but may be a two-layer or three-layer structure. When a polyurethane resin adhesive is used to form an adhesive resin layer, the adhesive resin layer 32 constitutes a part of the polyurethane resin layer 3 as shown in FIG. 1.

A method for forming the polyurethane resin layer is not particularly limited. Specifically, as one embodiment, the polyurethane resin layer may be directly laminated on the fibrous substrate by applying a polyurethane resin liquid to one side of the fibrous substrate by a method such as knife coating, roll coating, gravure coating or spray coating, followed by dry solidification or wet solidification. Alternatively, the polyurethane resin layer may be directly laminated on the fibrous substrate by applying a given polyurethane resin liquid to a releasable substrate by a method such as knife coating, followed by dry solidification or wet solidification, thereby forming a polyurethane resin layer, and then press bonding the polyurethane resin layer to one side of the fibrous substrate. Alternatively, the polyurethane resin layer may be laminated on the fibrous substrate by adhering the polyurethane resin layer formed on the releasable substrate to one side of the fibrous substrate using an adhesive.

The polyurethane resin constituting the polyurethane resin layer is not particularly limited, and examples thereof include a polyether-based polyurethane resin, a polyester-based polyurethane resin and a polycarbonate-based polyurethane resin. Those resins can be used in one kind alone or as mixtures of two or more kinds thereof. Above all, a polycarbonate-based polyurethane resin is preferred from the standpoints of abrasion resistance and fastness to light. The form of the polyurethane resin can be a non-solvent type, a hot-melt type, a solvent type and an aqueous type. Further, any polyurethane resin can be used regardless of a one-pack type or a two-pack curing type, and the polyurethane resin used can be appropriately selected depending on the required function and use purpose.

The polyurethane resin may contain the conventional additives such as a colorant, a plasticizer, a stabilizer, a filler, a lubricant, a paint, a foaming agent and a mold release agent. Those additives can be used in one kind alone or as mixtures of two or more kinds thereof.

The thickness of the polyurethane resin layer is not particularly limited, and may be, for example, 50 to 500 μm and preferably 100 to 300 μm.

The synthetic leather used in the composite skin material according to the present embodiment has openings. The openings can be formed by the conventional means such as needle punching, discharging or laser irradiation. The openings are holes penetrating from the front of the polyurethane resin layer to the fibrous substrate.

The opening ratio that is the proportion of the openings (area ratio) on the front of the synthetic leather (that is, the front of the polyurethane resin layer) is 1 to 15%. When the opening ratio is 1% or more, air permeability sufficient to eliminate stuffiness and stickiness is achieved. On the other hand, when the opening ratio is 15% or less, strength is excellent. The opening ratio is preferably 5 to 15%, and more preferably 5 to 10%.

The shape of the openings is not particularly limited, and can be selected from geometric patterns such as a circle, a triangle or a rectangle, considering designability. A circle is preferred from the standpoint of durability. The size of the openings is not particularly limited, and may be, for example, 0.15 to 7.50 mm$^2$.

The composite skin material according to the present embodiment comprises the synthetic leather having the openings and the woven fabric laminated on the back of the synthetic leather (that is, a fibrous substrate face) through the adhesive layer.

The woven fabric used to laminate on the back side of the synthetic leather is a cloth prepared by combining yarns in a warp direction and a weft direction, and a weave structure is not particularly limited. Examples of the weave structure include plain weave, twill weave and satin weave that are three foundation weaves; modified structures of those three foundation weaves; special structures such as crepe weave; mixed structures combining two or more kinds of those; and multiple structures in which those structures are combined to form multi-layered structures. Of those, plain weave is preferably used from the standpoint of air permeability.

A material of a fiber constituting the woven fabric is not particularly limited, and can use the conventional natural fiber, regenerated fiber, synthetic fiber, semi-synthetic fiber and the like. Those fibers can be used in one kind alone or as mixtures of two or more kinds thereof. From the standpoint of strength suitable for use in a vehicle interior material, the material of a fiber is preferably a synthetic fiber, and more preferably a polyester.

The cross-sectional shape of the fiber constituting the woven fabric is not particularly limited. The cross-sectional shape may be an ordinary circular form, and may also be a variant form such as a flat form, an elliptical form, a triangular form, a hollow form, a Y-form, a T-form or a U-form.

The type of the yarn constituting the woven fabric may be any of a filament yarn (long fiber yarn) and a spun yarn (short fiber yarn). The filament yarn, particularly a multi-filament yarn, may be twisted as necessary. Furthermore, crimp property and bulkiness may be given by false twisting or fluid disturbance treatment (taslan processing, interlace processing or the like). Above all, a spun yarn is preferred from the standpoint of feeling (hand-holding feeling).

The fineness (filament fineness) of the fiber constituting the woven fabric is preferably 1 to 2,000 dtex or 2 to 2,000 count. When the filament fineness is 1 dtex or more or 2,000 count or less, strength can be improved. When the filament fineness is 2,000 dtex or less or 2 count or more, the feeling is difficult to be coarse and hard, and a seat-covering workability can be improved.

The fineness (yarn fineness) of the yarn constituting the woven fabric is preferably 150 to 2,000 dtex or 1 to 1,000 count. When the yarn fineness is 150 dtex or more or 1,000 count or less, strength can be improved. When the yarn fineness is 2,000 dtex or less or 1 count or more, the feeling is difficult to be coarse and hard, and a seat-covering workability can be improved.

In the present embodiment, the warp density of the woven fabric is 25 to 50 yarns/25.4 mm. When the warp density of the woven fabric is 25 yarns/25.4 mm or more, strength can be improved. When the warp density of the woven fabric is 50 yarns/25.4 mm or less, air permeability can be secured. The lower limit of the warp density of the woven fabric is preferably 30 yarns/25.4 mm or more, and the upper limit thereof is preferably 35 yarns/25.4 mm or less.

In the present embodiment, the weft density of the woven fabric is 30 to 50 yarns/25.4 mm. When the weft density of the woven fabric is 30 yarns/25.4 mm or more, strength can be improved. When the weft density of the woven fabric is 50 yarns/25.4 mm or less, air permeability can be secured. The lower limit of the weft density of the woven fabric is preferably 35 yarns/25.4 mm or more, and the upper limit thereof is preferably 45 yarns/25.4 mm or less.

The total dtex number per 1 inch of the woven fabric (the total of dtex number of yarns present per 1 inch) is preferably 3,000 to 40,000 dtex in a warp direction and 4,500 to 60,000 dtex in a weft direction. When the total dtex number is the respective lower limits or more, strength can be improved. When the total dtex number is the respective upper limits or less, air permeability can be improved. The total count number per 1 inch (total diameter of yarns present per 1 inch) is preferably 0.025 to 50 count in a warp direction and 0.02 to 33 count in a weft direction. When the total count number is the respective lower limits or more, air permeability can be improved, and when the total count number is the respective upper limits or less, strength can be improved.

The woven fabric is adhered to the back side of the fibrous substrate of the synthetic leather through the adhesive layer comprising a polyurethane resin. Specifically, the woven fabric is laminated on a fibrous substrate face of the synthetic leather having openings using a polyurethane resin as an adhesive.

A reactive hot-melt polyurethane resin is preferably used as the adhesive. When the reactive hot-melt polyurethane resin is used, the adhesive does not permeate in the fibrous substrate or woven fabric. As a result, soft texture of the composite skin material obtained is not impaired. In detail, use of a hot-melt type resin makes it easy to control permeability, and soft texture of the composite skin material can be maintained. Further, use of a reactive type resin suppresses a reversible reaction, and as a result, durability can be obtained.

Specifically, it is preferred to apply the adhesive comprising a reactive hot-melt polyurethane resin to a fibrous substrate face of the synthetic leather by a method such as knife coating, roll coating, gravure coating or T-die coating, and press bonding the fibrous substrate having the adhesive thereon to the woven fabric while the reactive hot-melt polyurethane resin maintains to be viscous.

The application of the adhesive to a fibrous substrate face of the synthetic leather can prevent that air permeability of the woven fabric is impaired by the adhesive layer. In detail, in one embodiment, in the case where the adhesive comprising a reactive hot-melt polyurethane resin is applied to a fibrous substrate face of the synthetic leather and press bonded to the woven fabric while the adhesive maintains to be viscous, the adhesive applied to the fibrous substrate having openings is applied in the state that the openings are open, and the woven fabric is press bonded in such a state. As a result, the openings 5 of the synthetic leather 4 are not clogged by the adhesive layer 6 and are in an opened state, and the openings are covered with the woven fabric 7, as shown in FIG. 1. Specifically, through-holes 51 connected to the openings 5 are formed in the adhesive layer 6 at positions corresponding to the openings 5 of the synthetic leather 4, and the through-holes 51 are covered with the woven fabric 7 having air permeability. For this reason, air permeability as the composite skin material can be improved.

The polyurethane resin constituting the reactive hot-melt polyurethane resin is not particularly limited, and examples thereof include a polyether-based polyurethane resin, a polyester-based polyurethane resin and a polycarbonate-based polyurethane resin. Those resins can be used in one kind alone or as mixtures of two or more kinds thereof. Of those resins, a polycarbonate-based polyurethane resin and a polyether-based polyurethane resin are preferred from the standpoints of durability and hydrolysis resistance. The reactive hot-melt polyurethane resin may be a moisture-curing polyurethane resin, may be an ultraviolet-curing polyurethane resin and may be a moisture-curing and ultraviolet-curing polyurethane resin.

The mass per unit area of the adhesive layer (that is, an application amount of an adhesive) is preferably 15 to 100 $g/m^2$. The application amount of 15 $g/m^2$ or more can improve strength. Further, the application amount of 100 $g/m^2$ or less can improve air permeability. The application amount of the adhesive is more preferably 15 to 50 $g/m^2$, still more preferably 20 to 45 $g/m^2$, and still more preferably 30 to 45 $g/m^2$.

A method for producing the composite skin material for a vehicle according to the present embodiment is apparent from the above description, but comprehensively describing one preferred embodiment, the production method according to the one embodiment comprises:

a step of preparing a synthetic leather comprising a fibrous substrate and a polyurethane resin layer provided on a front side of the fibrous substrate, wherein the synthetic leather has a plurality of openings that are holes penetrating the fibrous substrate from the front of the polyurethane resin layer, and an opening ratio on the front of the polyurethane resin layer is 1 to 15%; and a step of applying an adhesive comprising a reactive hot-melt polyurethane resin to the back of the fibrous substrate in an application amount of 15 to 100 g/m², and adhering a woven fabric having warp density of 25 to 50 yarns/25.4 mm and a weft density of 30 to 50 yarns/25.4 mm to the back of the fibrous substrate through an adhesive layer comprising the adhesive.

The composite skin material for vehicle according to the present embodiment has air permeability of 5 to 100 cm³/cm²·s. This air permeability can eliminate stuffiness and stickiness when used as a vehicle interior material over a long period of time. The air permeability is preferably 20 to 80 cm³/cm²·s, and more preferably 30 to 60 cm³/cm²·s.

Tear strength in a warp direction and a weft direction of the composite skin material each is 20 to 150N, and tensile strength in a warp direction and a weft direction of the composite skin material each is 50 N/cm or more. Those tear strength and tensile strength satisfy sufficient strength for use as a vehicle interior material and can improve durability. The tear strength in a warp direction and a weft direction of the composite skin material each is preferably 40 to 140N, and more preferably 60 to 120N. The tensile strength in a warp direction and a weft direction of the composite skin material each is preferably 100 N/cm or more, and more preferably 150 N/cm or more. The upper limit of the tensile strength is not particularly limited, and may be, for example, 300 N/cm or less. The warp direction and weft direction of the composite skin material are the same as the warp direction and weft direction of the woven fabric.

The composite skin material for a vehicle according to the present embodiment as described above can increase air permeability of the composite skin material by providing openings on a synthetic leather in the above-described opening ratio, and can eliminate stuffiness and stickiness when used as a vehicle interior material over long period of time. Furthermore, by adhering the woven fabric having a specific density to a fibrous substrate face of the synthetic leather through a predetermined amount of the adhesive layer comprising a reactive hot-melt polyurethane resin, tear strength and tensile strength of the synthetic leather that were decreased by having openings can be improved without decreasing air permeability of the synthetic leather, and strength sufficient for use as a vehicle interior material can be given to the composite skin material for a vehicle.

EXAMPLES

The present invention is described below by reference to examples. However, the invention is not construed as being limited to those examples. Evaluation methods of the composite skin material for a vehicle obtained are as follows.

Air Permeability

Air permeability at room temperature (23° C.) was measured according to JIS L1096 8.26.1 Method A (Frazier type method). Air permeability is high as a measurement value is large.

Tear Strength

Tear strength is a maximum load (N) until a test piece breaks by tearing in the following tear test. In detail, three test pieces having a width of 40 mm and a length of 150 mm were collected from a warp direction and a weft direction, respectively. A cut having a length of 75 mm was formed in the test piece inside in parallel to a long side from the center of a short side. Using a tensile tester AUTOGRAPH AG-100A (manufactured by Shimadzu Corporation) under the conditions of room temperature: 20±2° C. and humidity: 65±5% RH, both ends of the side having the cut formed were fitted to a pair of grippers with a grip interval of 10 mm such that the front and back thereof are inverse, and the test piece was torn in a moving speed of 200 mm/min. The maximum load (N) until the test piece breaks was measured, and an average value was obtained. When the measurement value is 20N or more, it says to be sufficient tear strength for use as a vehicle interior material. Tear strength is excellent as the numerical value is large.

Tensile Strength

The tensile strength is a value (N/cm) obtained by dividing the maximum load (N) until the test piece breaks by a width (cm) of the test piece in the following tensile strength. In detail, three test pieces having a width of 30 mm and a length of 150 mm were collected from a warp direction and a weft direction, respectively. Under the conditions of room temperature: 20±2° C. and humidity: 65±5% RH, both ends of the test piece were held by grippers so as not to form sagging, and using a tensile tester AUTOGRAPH AG-100A (manufactured by Shimadzu Corporation), the test piece was broken in a grip width of 30 mm, a grip interval of 100 mm and a moving speed of a gripper of 200 mm/min. The maximum load (N) per unit width (cm) until the test piece breaks was measured, and an average value was obtained. When the measurement value is 50 N/cm or more, it says to be sufficient tensile strength for use as a vehicle interior material. Tensile strength is excellent as the numerical value is large.

Example 1

40 Parts by mass of dimethyl formamide were added to 100 parts by mass of a polycarbonate-based polyurethane resin (CRISVON NY-328 manufactured by DIC Corporation) to adjust a viscosity to about 2,000 mPa·s. Thus, a polyurethane resin liquid was prepared. The polyurethane resin liquid was applied to a release paper in a coating thickness of 200 μm, followed by drying at 130° C. for 2 minutes. Thus, a skin resin layer comprising a polyurethane resin was formed.

50 Parts by mass of dimethyl formamide were added to 100 parts by mass of a polycarbonate-based polyurethane adhesive (CRISVON TA-205 manufactured by DIC Corporation) to adjust a viscosity to about 4,500 mPa·s. The resulting adhesive resin solution was applied to the skin resin layer formed above in a coating thickness of 200 μm, followed by drying at 100° C. for 1 minute. Thus, an adhesive resin layer was formed. The adhesive resin layer thus obtained was laminated on a knitted fabric (tricot stitch made of polyester fibers, mass per unit area: 220 g/m²), and the resulting laminated was press bonded under a pressure of 39.2 N/cm² for 1 minute. Thus, a synthetic leather was obtained.

The synthetic leather obtained was subjected to drilling from a front side of the synthetic leather using a machine for punching work, and openings having an average opening diameter of 1.0 mm were formed in an opening ratio of 6.3%. Thus, the synthetic leather having openings was obtained.

An adhesive comprising a reactive hot-melt polyurethane resin (NH 128 manufactured by DIC Corporation) heated to 100° C. was applied to the back (woven fabric side) of the synthetic leather having openings in a coating amount of 40 g/m², and a plain weave fabric (warp: polyester spun yarn of 14 count two folded yarn, density: 31 yarns/25.4 mm and total count number per 1 inch: 0.226; weft: polyester spun yarn of 10 count two folded yarn, density: 41 yarns/25.4 mm and total count number per 1 inch: 0.122) was laminated on the synthetic leather through the adhesive while the adhesive has viscosity, followed by press bonding under a pressure of 39.2 N/cm$^2$ for 1 minute. Thus, a composite skin material was obtained.

The composite skin material obtained had air permeability of 43 cm$^3$/cm$^2$·s, and could eliminate stuffiness and stickiness when used as a vehicle interior material over a long period of time. Furthermore, the composite skin material had tear strength of 75N in a warp direction and 91N in a weft direction, and tensile strength of 159 N/cm in a warp direction and 231 N/cm in a weft direction. Thus, the composite skin material obtained had tear strength and tensile strength sufficient as a vehicle interior material, and was excellent in durability.

Example 2

A composite skin material was obtained in the same manner as in Example 1, except for using a plain weave fabric (warp: polyester spun yarn of 14 count two folded yarn, density: 31 yarns/25.4 mm and total count number per 1 inch: 0.226; weft: polyester spun yarn of 10 count two folded yarn, density: 35 yarns/25.4 mm and total count number per 1 inch: 0.143).

The composite skin material obtained had air permeability of 45 cm$^3$/cm$^2$·s, and could eliminate stuffiness and stickiness when used as a vehicle interior material over a long period of time. Furthermore, the composite skin material had tear strength of 73N in a warp direction and 76N in a weft direction, and tensile strength of 155 N/cm in a warp direction and 186 N/cm in a weft direction. Thus, the composite skin material obtained had tear strength and tensile strength sufficient as a vehicle interior material, and was excellent in durability.

Example 3

A composite skin material was obtained in the same manner as in Example 1, except for using a plain weave fabric (warp: polyester spun yarn of 14 count two folded yarn, density: 49 yarns/25.4 mm and total count number per 1 inch: 0.143; weft: polyester spun yarn of 10 count two folded yarn, density: 44 yarns/25.4 mm and total count number per 1 inch: 0.114).

The composite skin material obtained had air permeability of 28 cm$^3$/cm$^2$·s, and could eliminate stuffiness and stickiness when used as a vehicle interior material over a long period of time. Furthermore, the composite skin material had tear strength of 110N in a warp direction and 131N in a weft direction, and tensile strength of 193 N/cm in a warp direction and 277 N/cm in a weft direction. Thus, the composite skin material obtained had tear strength and tensile strength sufficient as a vehicle interior material, and was excellent in durability.

Comparative Example 1

A composite skin material was obtained in the same manner as in Example 1, except for using a plain weave fabric (warp: polyester spun yarn of 2000 count two folded yarn, density: 18 yarns/25.4 mm and total count number per 1 inch: 55.6; weft: polyester spun yarn of 2000 count two folded yarn, density: 25 yarns/25.4 mm and total count number per 1 inch: 40.0).

The composite skin material obtained had air permeability of 46 cm$^3$/cm$^2$·s, and could eliminate stuffiness and stickiness when used as a vehicle interior material over a long period of time. The composite skin material had tear strength of 15N in a warp direction and 13N in a weft direction, and tensile strength of 45 N/cm in a warp direction and 41 N/cm in a weft direction. Thus, the composite skin material obtained did not have tear strength and tensile strength sufficient as a vehicle interior material, and was poor in durability.

Comparative Example 2

A composite skin material was obtained in the same manner as in Example 1, except for using a plain weave fabric (warp: polyester spun yarn of 2 count two folded yarn, density: 60 yarns/25.4 mm and total count number per 1 inch: 0.017; weft: polyester spun yarn of 2 count two folded yarn, density: 55 yarns/25.4 mm and total count number per 1 inch: 0.018).

The composite skin material obtained had air permeability of 1 cm$^3$/cm$^2$·s, and could not eliminate stuffiness and stickiness when used as a vehicle interior material over a long period of time. On the other hand, the composite skin material had tear strength of 198N in a warp direction and 193N in a weft direction, and tensile strength of 328 N/cm in a warp direction and 355 N/cm in a weft direction. Thus, the composite skin material obtained had tear strength and tensile strength sufficient as a vehicle interior material, and was excellent in durability.

Comparative Example 3

A composite skin material was obtained in the same manner as in Example 1, except that the synthetic leather was subjected to drilling such that openings having an average diameter of 8.0 mm are formed in an opening ratio of 16.4%, and the coating amount of the adhesive was changed to 12 g/m$^2$.

The composite skin material obtained had air permeability of 133 cm$^3$/cm$^2$·s. On the other hand, the composite skin material had tear strength of 18N in a warp direction and 17N in a weft direction, and tensile strength of 138 N/cm in a warp direction and 185 N/cm in a weft direction. Thus, the composite skin material obtained did not have tear strength sufficient as a vehicle interior material, and was poor in durability.

Comparative Example 4

A composite skin material was obtained in the same manner as in Example 1, except that the coating amount of the adhesive was changed to 120 g/m$^2$.

The composite skin material obtained had air permeability of 3 cm$^3$/cm$^2$·s, and could not eliminate stuffiness and stickiness when used as a vehicle interior material over a long period of time. On the other hand, the composite skin material had tear strength of 73N in a warp direction and 94N in a weft direction, and tensile strength of 152 N/cm in a warp direction and 238 N/cm in a weft direction. Thus, the composite skin material obtained had tear strength and tensile strength sufficient as a vehicle interior material, and was excellent in durability.

As described above, the composite skin material for a vehicle according to the present embodiment can be used in various vehicle interior materials including automobile interior materials such as a seat, a ceiling material, a dashboard, a door lining material, a steering wheel and the like of automobiles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A composite skin material for a vehicle, comprising a fibrous substrate, a polyurethane resin layer provided on the front side of the fibrous substrate, and a woven fabric adhered to the hack side of the fibrous substrate through an adhesive layer comprising a polyurethane resin, the polyurethane resin layer having a plurality of openings on the front thereof, wherein:

a plurality of the openings are holes penetrating the fibrous substrate from the front of the polyurethane resin layer, and an opening ratio on the front of the polyurethane resin layer is 1 to 15%;

the woven fabric has a warp density of 25 to 50 yarns/25.4 mm and a weft density of 30 to 50 yarns/25.4 mm;

through-holes connected to the openings are formed on the adhesive layer at the positions corresponding to the openings, and the through-holes are covered with the woven fabric;

the mass per unit area of the adhesive layer is 15 to 100 $g/m^2$;

air permeability of the composite skin material is 5 to 100 $cm^3/cm^2 \cdot s$;

tear strengths in a warp direction and a weft direction of the composite skin material each are 20 to 150N; and tensile strengths in a warp direction and a weft direction of the composite skin material each are 50 N/cm or more.

2. The composite skin material for a vehicle according to claim 1, wherein the fibrous substrate is a woven fabric, a knitted fabric, or a non-woven fabric.

3. The composite skin material for a vehicle according to claim 1, wherein the fibrous substrate is a knitted fabric.

4. The composite skin material for a vehicle according to claim 1, wherein the through-holes formed in the adhesive layer are provided only at the positions corresponding to the openings.

5. The composite skin material for a vehicle according to claim 1, wherein the adhesive of the adhesive layer comprises a reactive hot-melt polyurethane resin as a layer which is continuous and coextensive with the woven fabric except for the openings formed on the adhesive layer.

* * * * *